United States Patent [19]

Flores et al.

[11] Patent Number: 4,680,357

[45] Date of Patent: Jul. 14, 1987

[54] INTERPOLYMERS OF ETHYLENE AND ALKENYL PYRIDINES AND PREPARATION THEREOF

[75] Inventors: David P. Flores; John G. Meiller; James D. Massie, all of Lake Jackson, Tex.

[73] Assignee: The Dow Chemical Company, Midland, Mich.

[21] Appl. No.: 737,989

[22] Filed: May 28, 1985

[51] Int. Cl.$^4$ .............................................. C08F 26/06
[52] U.S. Cl. ...................................... 526/265; 428/461
[58] Field of Search ......................... 526/265; 528/392

[56] References Cited

U.S. PATENT DOCUMENTS

| | | | |
|---|---|---|---|
| 2,749,349 | 6/1956 | Cislak | 526/265 |
| 3,607,815 | 9/1971 | Patton | 260/30.6 |
| 3,754,055 | 8/1973 | Rembaum | 260/879 |
| 3,828,016 | 8/1974 | Bacskai | 260/88.3 |
| 3,947,526 | 4/1976 | Bacskai | 260/878 |
| 3,974,114 | 8/1976 | Sowa | 260/23 |
| 4,026,962 | 5/1977 | Lambla et al. | 260/827 |
| 4,031,038 | 6/1977 | Grinstead et al. | 260/2.2 |
| 4,137,382 | 1/1979 | Vetter | 528/392 |
| 4,205,152 | 5/1980 | Mizuguchi et al. | 526/265 |
| 4,351,931 | 9/1982 | Armitage | 526/227 |

OTHER PUBLICATIONS

Leonard, E. C. (Ed.), *Vinyl and Diene Monomers*, Part 3, Wiley-Science, pp. 1389-1393, New York, (1971).
Martin, E. C., et al, "Irradiation-Grafted Polymeric Films. III. Development of Improved Anion-Selective Membranes for Desalting Water," *Separation Science*, 6, pp. 637-644 (Oct., 1971).
Hofmann, W., "Polymer Chemistry of Synthetic Elastomers," Part I, pp. 222-225, Interscience Publishers (1968).
Kritskaya, D. A., et al, "Radiation-Induced Gas-Phase Grafted Polymerization as a Method for Producing Macromolecular Carries for Active Catalytic Sites," *J. Poly. Sci.: Polym. Symp.* 68, pp. 23-31 (1980).
Haws, J. R., "Rubbers from Basic Monomers: Vinyl Pyridine Polymers," *Rubber Chem. and Tech.* 30, pp. 1387-1399 (1957).

*Primary Examiner*—Paul R. Michl
*Attorney, Agent, or Firm*—W. J. Lee; D. N. Lundeen

[57] ABSTRACT

Novel interpolymers of ethylene, omega-alkenyl pyridines, such as vinylpyridines, and optionally, another monomer interpolymerizable therewith. The interpolymer is prepared by free-radical initiation in a reactor operated at a pressure of from about 70 MPa to about 350 MPa and a temperature of from about 50° C. to about 300° C. The interpolymers are primarily useful as adhesives.

38 Claims, No Drawings

INTERPOLYMERS OF ETHYLENE AND ALKENYL PYRIDINES AND PREPARATION THEREOF

FIELD OF THE INVENTION

This invention pertains to interpolymers of ethylene and alkenyl pyridines, such as vinyl pyridine, and a method of preparing the same.

BACKGROUND OF THE INVENTION

Copolymers of olefinically unsaturated monomers are very well known. For example, copolymers of ethylene and another alpha-olefin such as propylene, 1-butene, 1-pentene, 1-hexene, 1-heptene, 1-octene and the like are readily available. Other monomers which have been polymerized with ethylene and/or alpha-olefins include acrylic acid, alkyl acrylates, methacrylic acid, vinyl acetate, acrylonitrile and carbon monoxide.

Two primary types of olefin polymerization techniques are used commercially for preparing high molecular weight olefin polymers and copolymers. One technique involves coordination catalysts of the Ziegler or Phillips type and include variations of the Ziegler type, such as the Natta type. The catalysts may be used at very high pressure, but may also be used (and generally are) at very low or intermediate pressures. The products made by these coordination catalysts are generally known as linear polymers because of the substantial absence of branched chains of polymerized monomer units pendant from the main polymer backbone. The other commercially-used technique involves very high pressure, high temperature, and the use of a free radical initiator, such as a peroxide. These polymers contain branched chains of polymerized monomer units pendant from the main polymer backbone. Such a technique has been employed to prepare high molecular weight, uniformly random copolymers of ethylene and acrylic or methacrylic acid as is described in U.S. Pat. No. 4,351,931. These methods have worked very well and are commercially attractive with such monomers as ethylene and acrylic acid; however, when more reactive monomers, such as styrene are copolymerized with ethylene, the rate of reaction has been difficult to control and the methods have not generally been used with such highly reactive species.

Vinyl pyridine homopolymers and copolymers are also widely known. As summarized in *Vinyl* and *Diene Monomers*, Part 3, E. C. Leonard (Ed.), Wiley-Interscience, (New York 1971) vinyl pyridines have been copolymerized with various monomers, including acrylamide, acrylonitrile, butadiene, butyl acrylate, chloroprene, diallyl ether, 2,5-dichlorostyrene, ethyl acrylate, isoprene, isopropenal acetylene, methacrylic acid, methyl acrylate, methyl methacrylate, phenylacetylene, styrene and vinyl acetate. Homopolymers and copolymers of vinyl pyridines generally have the same mechanical properties as styrene homopolymers and copolymers; however, because styrene is much less expensive, vinyl pyridine polymers are used commercially only in specialty applications such as cord dips for the tire industry, with acrylic fibers to improve dye receptivity, emulsifiers for polymerizations in acidic media, anion exchange resins, polyelectrolytes, and in photographic emulsions.

Vinyl pyridine homopolymers and copolymers have been prepared by free-radical and anionic methods. The free radical polymerization techniques have included liquid-phase free-radical polymerization, emulsion polymerization, radiation-induced polymerization and coordination polymerization. It has also been known to prepare block and graft copolymers of vinyl pyridines with various backbone polymers such as, for example, polyethylene, polypropylene and polybutadiene.

SUMMARY OF THE INVENTION

Broadly, the invention is an interpolymer, comprising ethylene, and interpolymerized therewith, from about 0.01 to about 28 mole percent on an interpolymer basis of alkenyl pyridines having the general formula

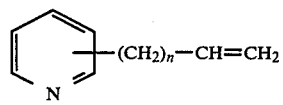

wherein n can be 0 or an integer from 1 to about 10. Also, one or more of the pyridine moiety hydrogen atoms can be radically substituted, and the pyridine moiety can be a pyridinium salt or an N-substituted oxide or sulfide. The interpolymer optionally comprises one or more additional monomers copolymerizable with ethylene.

The invention is also a process of preparing an interpolymer of ethylene and a pyridine derivative, comprising the steps of (a) charging a reactor with ethylene, free radical initiator, and alkenyl pyridine having the formula

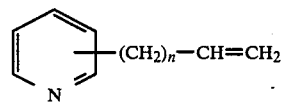

wherein n can be 0 or an integer from 1 to about 10; (b) interpolymerizing the ethylene and the alkenyl pyridine in the reactor at a pressure of from about 70 MPa to about 350 MPa and a temperature of from about 50° C. to about 300° C.; and (c) recovering the interpolymer from the reactor. Optionally, the reactor may be charged with one or more additional monomers which are copolymerizable with ethylene.

DETAILED DESCRIPTION OF THE PREFERRED EMBODIMENTS

The two essential monomers in the random interpolymer are ethylene and an alkenyl-substituted pyridine. The alkenyl pyridines contemplated for use in the invention include substituted and unsubstituted alkenyl pyridines having the formula

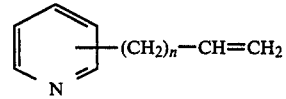

wherein n can be 0 or an integer from 1 to about 10. Contemplated additional substituents of the ring structure of the alkenyl pyridines include radicals, such as, for example, omega-alkenyl having 2–12 carbon atoms, hydroxyl, amino, carboxyl, cyano, formyl, sulfo, halo, benzoyl, benzyl, phenyl, alkoxy, hydroxyalkyl, aminoalkylene, α-alkanoyloxy-ω-alkenyl, or alkyl having 1-10 carbon atoms. Also contemplated are radicals which form a cyclic, polycyclic, or heterocyclic group. Further contemplated are the pyridinium salts and N-substituted oxides and sulfides of such pyridine derivatives. Many such monomers and their methods of preparation are well known; the preparation of others is believed to be within the ability of those skilled in the art.

Specific representative examples of contemplated pyridine derivatives include:
2-vinyl pyridine;
3-vinyl pyridine;
4-vinyl pyridine;
3-methyl-2-vinyl pyridine;
4-methyl-2-vinyl pyridine;
6-methyl-2-vinyl pyridine;
3-ethyl-2-vinyl pyridine;
5-ethyl-2-vinyl pyridine;
4-(2-hydroxyethyl)-2-vinyl pyridine;
4-propoxy-2-vinyl pyridine;
2-methyl-3-vinyl pyridine;
5-bromo-3-vinyl pyridine;
2-methyl-5-vinyl pyridine;
2-ethyl-5-vinyl pyridine;
N,N-dimethyl-2-(5-vinyl-2-pyridyl)-ethanamine;
N,N,N',N'-tetramethyl-2-(5-vinyl-2-pyridyl)-1,3-propane diamine;
N,N-dimethyl-2-(5-vinyl-2-pyridyl)-2-propen-1-amine;
2-methyl-4-vinyl pyridine;
2,4-dimethyl-6-vinyl pyridine;
2-chloro-4-methyl-3-vinyl pyridine;
2,6-dichloro-4-methyl-3-vinyl pyridine;
2,4-divinyl pyridine;
2,5-divinyl pyridine;
2,6-divinyl pyridine;
2-methyl-4,6-divinyl pyridine;
4-methyl-2,6-divinyl pyridine;
2-isopropenyl pyridine;
3-isopropenyl pyridine;
5-(3-bromo-isopropenyl)pyridine;
4-(1-acetoxyvinyl)pyridine;
1-methyl-4-vinylpyridinium p-toluenesulfonate;
2-vinyl pyridine N-oxide;
5-ethyl-2-vinyl pyrindine N-oxide;
N-vinyl pyridinium perchlorate;
N-vinyl pyridinium fluoroborate; and
N-vinyl pyridinium hexachloroplatinate.

Because they are readily available commercially, the preferred pyridine derivatives are 2-vinyl pyridine, 4-vinyl pyridine, and 2-methyl-5-vinyl pyridine.

The interpolymer contains from about 0.01 to about 28 mole percent of interpolymerized alkenyl pyridine, preferably from about 1 to about 20 mole percent, and more especially from about 3 to about 7 mole percent, with the remainder being ethylene.

Optionally, the interpolymer may also contain from about 0 to about 30 weight percent of one or more additional monomers interpolymerized with the ethylene and alkenyl pyridine, by weight of the interpolymer (the mole percentage will depend on the molecular weight of the additional monomer or monomers). Such additional monomers may include, for example: alpha-olefins having 3 to 10 carbon atoms, such as propylene, 1-butene, 1-hexene, 1-octene, and 1-decene; dienes having from 4 to 10 carbon atoms, such as 1,3-butadiene and 1,5-hexadiene; acrylic acid monomers, such as acrylic acid, methacrylic acid, methyl methacrylic acid, ethacrylic acid, crotonic acid, isocrotonic acid, tiglic acid, angelic acid and senecioic acid; alkyl esters of such acrylic acid monomers, such as n-butyl acrylate, methyl methacrylate and the like; ethylenically unsaturated nitriles, such as acrylonitrile, methacrylonitrile, allyl cyanide, allyl methyl cyanide and the like; vinyl esters of carboxylic acids such as vinyl acetate, vinyl formate and the like; vinyl monomers, such as vinyl ethers, vinyl amides, vinyl aromatics and the like; and other non-vinyl monomers known to be copolymerizable with ethylene, such as, for example, carbon monoxide.

The molecular weight of the interpolymers of the invention may vary over a wide range. Depending upon the intended use, the interpolymers may, for example, have a melt flow value per ASTM D-1238 of from about 1 dg/min, condition L (230° C./2.16 kg), to about 100 dg/min, condition A (125° C./0.325 kg).

The interpolymers of the invention are contemplated for a wide variety of uses, including, for example: adhesive layers to both metallic and non-metallic substrates; hot melt adhesives; pressure sensitive adhesives; reactive intermediates; dye receptive films, fibers and foams; ion-exchange membranes, beads, fibers, foams and films; adhesive layers for barrier films; shielding tapes laminated to metals for wire and cable applications; tie layers, glue layers and primers for metallic and non-metallic substrates; adhesive layers for halogenated polymers; tire cord binders; elastomeric applications such as toys, ball covers, and wire and cable insulation; adhesive layers to polyvinylidene chloride or polyvinyl chloride films; and, adhesive promoters for non-functional polyethylene homopolymers.

The interpolymers of the present invention are especially useful as hot melt adhesives for nonpolar substrates and, quite unexpectedly, for metallic substrates.

The interpolymers of the invention are prepared by charging a reactor with the ethylene, the alkenyl pyridine, any optional monomer described above and a free radical initiator, interpolymerizing the ethylene, alkenyl pyridine and any optional monomer in the reactor at a pressure from about 70 MPa to about 350 MPa, preferably from about 100 MPa to about 200 MPa, and at a temperature of from about 50° C. to about 300° C., preferably from about 100° C. to about 250° C., and recovering the interpolymer from the reactor. The reactor may be operated on a batch basis, but is preferably operated on a continuous basis.

The proportion of monomer reactants in the reactor charge will vary over a wide range, depending primarily on the relative reactivities of the particular monomers and the desired content of the particular monomers interpolymerized in the resulting interpolymer. Generally, the ethylene conversion will be about 10-15%, while that of the alkenyl pyridine will be nearly 100%.

The free radical initiator may be oxygen, organic peroxide, such as, for example t-butyl peroctoate, benzoyl peroxide, lauryl peroxide, t-butyl peroxy pivalate, di-t-butyl peroxide, di(2-ethyl hexyl)peroxy dicarbonate, or t-butyl peracetate, or azo compounds, such as, for example, azobis(1-cyano-1,4-dimethyl butane) or azobisisobutyronitrile. Preferably, the initiator is an azo compound.

An inert organic solvent may be employed to transfer the alkenyl pyridine, optional monomers and/or initiator into the reactor. Especially where relatively small proportions of these components makes accurate metering difficult, employment of a solvent is preferred. Suitable solvents include, for example, methyl ethyl ketone and isooctane.

It is also possible to employ a chain transfer agent such as, for example, isobutane, to control the average molecular weight of the copolymer within selected ranges.

Depending on the intended application, it may be desirable to provide either a uniformly random interpolymer or a non-uniformly random interpolymer. In a batch process, the initial concentration of the monomers will initially result in formation of a uniformly random interpolymer; however, because of the variation in reaction rates among the monomers, ethylene generally being less reactive than omega-alkenyl pyridines, the more reactive monomer is used up at a faster rate. Thus, as the reaction continues, the concentration of the more reactive monomer decreases more rapidly than the less reactive monomer, and because the rate of reaction is generally exponentially proportional to the monomer concentration, the resulting interpolymer contains a less proportion of the more reactive monomer. In some cases, where the more reactive monomer is completely reacted and the polymerization continues, the product may resemble a graft copolymer of the uniformly random interpolymer, containing both the more reactive omega-alkenyl pyridine monomer and the less reactive ethylene monomer, grafted to ethylene homopolymer, rather than a substantially uniformly random ethylene-omega-alkenyl pyridine interpolymer.

In a batch process, formation of a substantially uniformly random interpolymer can be achieved by providing sufficient mixing, reducing the proportion of free-radical initiator charged to the reactor and/or operating the reactor at a lower temperature and/or pressure. It is also possible to initially charge a portion of the monomers to the reactor, primarily the less reactive monomers such as ethylene, and to subsequently meter the more reactive monomers into the stirred reactor as the polymerization proceeds.

In a continuous process, formation of a substantially uniformly random interpolymer can be achieved by charging the monomers to the reactor at preselected ratios and providing sufficient agitation to maintain a substantially constant and homogenous monomer concentration in the reactor.

EXAMPLE 1

To a 200 ml rocking autoclave reactor was charged 1.5 g 4-vinyl pyridine, 0.08 g azobisisobutyronitrile dissolved in 1.0 ml methyl ethyl ketone, and 100.4 g ethylene. The temperature and pressure of the reactor were slowly increased from 23° C. and 90.2 MPa to 100° C. and 152 MPa. This temperature and pressure were maintained for 2 hours. Approximately 4 g of an off-white polymer was formed.

The polymer had a melting point of 91.3° C., a freezing point of 71.4° C., a heat of fusion of 1.96 cal/g, and contained 3.41 wt.% nitrogen, corresponding to about 25.4 wt.% 4-vinyl pyridine. An infrared scan exhibited absorption bands at 1593 cm$^{-1}$, 1550 cm$^{-1}$ and 812 cm$^{-1}$, indicating C=C, C=N, and C—H bonds, respectively. A differential thermal analysis showed a substantially amorphous, random copolymer.

EXAMPLE 2

The reactor of Example 1 was charged with 0.99 g 4-vinyl pyridine, 0.08 g azobisisobutyronitrile dissolved in 1.0 ml methyl ethyl ketone, and 104 g ethylene. The reactor was heated slowly to 100° C., at which temperature the reactor had a pressure of 180 MPa. This temperature and pressure were maintained for 2 hours. 2.65 g of polymer was recovered.

The polymer had a melting range of 90.0°–103.9° C., a freezing point of 85.6° C., a heat of fusion of 17.95 cal/g, and contained 15.6 wt.% 4-vinyl pyridine. A differential thermal analysis indicated a heterogeneous polymer.

EXAMPLE 3

The reactor of Examples 1 and 2 was charged with 0.99 g 4-vinyl pyridine, 0.04 g azobisisobutyronitrile dissolved in 1.0 ml methyl ethyl ketone, and 104 g ethylene. The reactor was heated slowly to 125° C., at which temperature the reactor had a pressure of 180 MPa. This temperature and pressure were maintained for 2 hours. 2.6 g of polymer was recovered.

The polymer had a melting range of 86.8°–102.4° C., a freezing point of 79.6° C., a heat of fusion of 17.35 cal/g, and contained 15.1 wt.% 4-vinyl pyridine. A differential thermal analysis indicated a heterogeneous polymer.

EXAMPLE 4

Three batches of ethylene-vinyl pyridine copolymers were prepared under approximately identical conditions. For each batch, the reactor or Examples 1–3 was charged with 0.05 g azobisisobutyronitrile dissolved in 1.0 ml methanol and sufficient ethylene to maintain a pressure of 180 MPa and a temperature of 125° C. for 2 hours. 2.9 g, 3.7 g and 2.6 g, respectively, of the copolymer was recovered. The first and third batches had a 4-vinyl pyridine content of 16.5 wt.% and were indicated by differential thermal analysis to be heterogeneous. It is believed that the 4-vinyl pyridine content and the heterogeneity of the second batch was approximately identical to that of the first and third.

COMPARATIVE I

Poly(4-vinyl pyridine) was purchased from Reilly Tar & Chemical Corporation for comparative purposes. The poly(4-vinyl pyridine) had a viscosity average molecular weight of 38,000 and a softening point of 158°–162° C.

ADHESIVE TESTING

Peel testing was used to evaluate the adhesive properties of the polymer of Examples 2–4. Test samples were prepared by compression molding a small amount of polymer between 0.025 mm substrate films for 15s at 108 MPa and 177° C. Bond strengths were determined by a 180° peel test at 5.1 cm/min with an Instron Tensiometer. The results are presented in Table I.

TABLE I

| Substrate | Peel Strength (Kg/cm width) | | |
|---|---|---|---|
| | Ex. 2 | Ex. 3 | Ex. 4[4] |
| Polyvinylidene Chloride | .327[1] | .618[1] | |
| Polyester | .366 | .452 | |
| Polyethylene Terephthalate | 1.16 | | |
| Low Density Polyethylene | | | .804[1,2] |
| Oriented Polypropylene | | | .272[1,3] |
| Nylon 6 | | | .225 |

TABLE I-continued

| | Peel Strength (Kg/cm width) | | |
| Substrate | Ex. 2 | Ex. 3 | Ex. 4[4] |
| --- | --- | --- | --- |
| Aluminum | | - | .500 |

Notes:
[1]Film tear.
[2]Molded at 149° C.
[3]Molded at 163° C.
[4]Highest observed value of the three batches of Example 4.

The adhesion of the novel interpolymers to aluminum was unexpected. It is believed that similar adhesion to other metals and polar substrates would result. In contrast, Comparative I did not adhere (i.e., peel strength about 0 Kg/cm width) to polyethylene terephthalate, polyvinylidene chloride, low density polyethylene, oriented polypropylene, nylon 6, or aluminum.

While we have described our novel interpolymers and the methods for preparing them above, many variations will occur to those skilled in the art. It is intended that all such variations which fall within the scope and spirit of the appended claims be embraced thereby.

We claim:

1. An interpolymer exhibiting utility as an adhesive to metallic substrates, consisting essentially of:
   (a) from about 93 to about 97 mole percent ethylene on an interpolymer basis; and
   (b) interpolymerized therewith, from about 3 to about 7 mole percent on an interpolymer basis of an alkenyl pyridine having the formula:

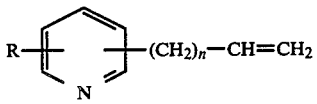

wherein n is 0 or an integer from 1 to about 10, R is hydrogen, ω-alkenyl having 2–12 carbon atoms, hydroxyl, amino, carboxyl, cyano, formyl, sulfo, halo, benzyl, benzoyl, phenyl, alkoxy, hydroxyalkyl, aminoalkylene, α-alkanoyl-ω-alkenyl, or alkyl having 1–10 carbon atoms.

2. An interpolymer exhibiting utility as an adhesive to metallic substrates, consisting essentially of:
   (a) from about 93 to about 97 mole percent ethylene on an interpolymer basis; and
   (b) interpolymerized therewith, from about 3 to about 7 mole percent of a pyridine derivative selected from the group consisting of: 2-vinylpyridine, 4-vinylpyridine, 2-methyl-5-vinylpyridine, and combinations thereof.

3. The interpolymer of claim 1, further consisting essentially of:
   (c) interpolymerized with said ethylene and said alkenyl pyridine, a minor proportion of additional monomer copolymerizable with ethylene and selected from the group consisting of: alpha-olefins having 3–10 carbon atoms, alpha,beta-ethylenically unsaturated carboxylic acids having 3–12 carbon atoms and alkyl esters thereof, ethylenically unsaturated nitriles, alkenyl esters of saturated carboxylic acids having 3–12 carbon atoms, dienes having 4–10 carbon atoms, carbon monoxide, and combinations thereof.

4. The interpolymer of claim 2, further consisting essentially of:
   (c) interpolymerized with said ethylene and said alkenyl pyridine, a minor proportion of additional monomer copolymerizable with ethylene and selected from the group consisting of: alpha-olefins having 3–10 carbon atoms, alpha,beta-ethylenically unsaturated carboxylic acids having 3–12 carbon atoms and alkyl esters thereof, ethylenically unsaturated nitriles, alkenyl esters of saturated carboxylic acids having 3–12 carbon atoms, dienes having 4–10 carbon atoms, carbon monoxide, and combinations thereof.

5. A new process of preparing an interpolymer of ethylene and a pyridine derivative, comprising the steps of:
   (a) charging a reactor with:
      (i) ethylene;
      (ii) a free radical initiator selected from the group consisting of oxygen, peroxides, and azo-bis compounds; and
      (iii) an alkenyl pyridine having the formula:

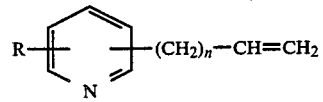

wherein n is 0 or an integer from 1 to about 10, R is hydrogen, ω-alkenyl having 2–12 carbon atoms, hydroxyl, amino, carboxyl, cyano, formyl, sulfo, halo, benzyl, benzoyl, phenyl, alkoxy, hydroxyalkyl, aminoalkylene, α-alkanoyl-ω-alkenyl, or alkyl having 1–10 carbon atoms; and
   (b) interpolymerizing said ethylene and said alkenyl pyridine in said reactor at a pressure of from about 70 MPa to about 350 MPa and a temperature of from about 50° C. to about 300° C.; and
   (c) recovering said interpolymer from said reactor.

6. The interpolymer of claim 2 wherein said interpolymer is applied as a thermoplastic adhesive to a substrate.

7. The interpolymer of claim 6 wherein said substrate is metallic.

8. The process of claim 5, further comprising the step of applying said interpolymer as a thermoplastic adhesive to a substrate.

9. The process of claim 8 wherein said substrate is metallic.

10. The interpolymer of claim 4, wherein said additional monomer is carbon monoxide.

11. The process of claim 5, wherein said charge reactants further comprise:
   (iv) an additional monomer selected from the group consisting of: alpha-olefins having 3–12 carbon atoms, diolefins having 4–10 carbon atoms, alpha,-beta-ethylenically unsaturated carboxylic acids, alkyl esters of alpha,beta-ethylenically unsaturated carboxylic acids, ethylenically unsaturated nitriles, alkenyl esters of saturated carboxylic acids, carbon monoxide, and combinations thereof; and
   said interpolymerization includes interpolymerizing said additional monomer with said ethylene and said alkenyl pyridine.

12. The interpolymer of claim 1, wherein said alkenylpyridine is selected from the group consisting of: 2-vinylpyridine, 4-vinylpyridine, 2-methyl-5-binylpyridine, and combinations thereof.

13. The interpolymer of claim 1, wherein said alkenylpyridine is selected from the group consisting of:

3-vinylpyridine;
3-methyl-2-vinyl pyridine;
4-methyl-2-vinyl pyridine;
6-methyl-2-vinyl pyridine;
3-ethyl-2-vinyl pyridine;
5-ethyl-2-vinyl pyridine;
2-methyl-3-vinyl pyridine;
2-ethyl-5-vinyl pyridine;
2-methyl-4-vinyl pyridine;
2,4-dimethyl-6-vinyl pyridine;
2-isopropenyl pyridine;
3-isopropenyl pyridine; and combinations thereof.

14. The interpolymer of claim 1, wherein said alkenylpyridine is selected from the group consisting of:
2,4-divinylpyridine;
2,5-divinylpyridine;
2,6-divinylpyridine;
2-methyl-4,6-divinylpyridine;
4-methyl-2,6-divinylpyridine; and combinations thereof.

15. The interpolymer of claim 1, wherein said alkenylpyridine is selected from the group consisting of:
5-bromo-3-vinylpyridine;
2-chloro-4-methyl-3-vinylpyridine;
2,6-dichloro-4-methyl-3-vinylpyridine; and combinations thereof.

16. The interpolymer of claim 1, wherein said alkenylpyridine is selected from the group consisting of:
4-(2-hydroxyethyl)-2-vinylpyridine;
4-propoxy-2-vinylpyridine;
N,N-dimethyl-2-(5-vinyl-2-pyridyl)-ethanamine;
N,N,N',N'-tetramethyl-2-(5-vinyl-2-pyridyl)-1,3-propane diamine;
N,N-dimethyl-2-(5-vinyl-2-pyridyl)-2-propen-1-amine;
5-(3-bromo-iospropenyl)pyridine;
4-(1-acetoxyvinyl)pyridine; and combinations thereof.

17. The interpolymer of claim 3, wherein said additional monomer is selected from the group consisting of: propene, 1-butene, 1-pentene, 1-hexene, 1-octene, 1-decene, acrylic acid, alkyl acrylate, methacrylic acid, alkyl methacrylate, methyl methacrylic acid, ethacrylic acid, crotonic acid, isocrotonic acid, tiglic acid, angelic acid, senecioic acid, and alkyl esters of said acids, acrylonitrile, methacrylonitrile, allyl cyanide, allyl methylcyanide, 1,3-butadiene, 1,4-pentadiene, 1,5-hexadiene, 1,7-octadiene, 1,9-decadience, vinyl formate, vinyl acetate, carbon monoxide, and combinations thereof.

18. The interpolymer of claim 1, wherein said interpolymer has a melt flow value of from about 1 dg/min, condition L, to about 100 dg/min, condition A.

19. The interpolymer of claim 2, wherein said interpolymer has a melt flow value of from about 1 dg/min, condition L, to about 100 dg/min, condition A.

20. The interpolymer of claim 4, wherein said additional monomer is selected from the group consisting of: propylene, 1-butene, 1-pentene, 1-hexene, 1-heptene, 1-octene, 1-decene and combinations thereof.

21. The interpolymer of claim 4, wherein said additional monomer is selected from the group consisting of: 1,3-butadiene, 1,4-pentadiene, 1,5-hexadiene, 1,7-octadiene, 1,9-decadiene, and combinations thereof.

22. The interpolymer of claim 4, wherein said additional monomer is selected from the group consisting of: acrylic acid, methacrylic acid, methyl methacrylic acid, ethacrylic acid, crotonic acid, isocrotonic acid, tiglic acid, angelic acid, senecioic acid and alkyl esters thereof, acrylonitrile, methacrylonitrile, allyl cyanide, methyl allyl cyanide, and combinations thereof.

23. The interpolymer of claim 4, wherein said additional monomer is selected from the group consisting of: vinyl formate, vinyl acetate, and combinations thereof.

24. The process claim 5, wherein said initiator is selected from the group consisting of: t-butyl peroctoate, benzoyl peroxide, lauryl peroxide, t-butyl paroxypivalate, di-t-butyl peroxide, and combinations thereof.

25. The process of claim 5, wherein said initiator is selected from the group consisting of: azobisisobutyronitrile, azobis(1-cyano-14-dimethyl butane), and combinations thereof.

26. The process of claim 5, wherein said alkenyl pyridine is selected from the group consisting of: 2-vinylpyridine, 4-vinylpyridine, 2-methyl-5-vinylpyridine, and combinations thereof.

27. The process of claim 5, wherein said alkenyl pyridine is selected from the group consisting of:
3-vinylpyridine;
3-methyl-2-vinyl pyridine;
4-methyl-2-vinyl pyridine;
6-methyl-2-vinyl pyridine;
3-ethyl-2-vinyl pyridine;
5-ethyl-2-vinyl pyridine;
2-methyl-3-vinyl pyridine;
2ethyl-5 -vinyl pyridine;
2-methyl-4-vinyl pyridine;
2,4-dimethyl-6-vinyl pyridine;
2-isopropenyl pyridine;
3-isopropenyl pyridine; and combinations thereof.

28. The process of claim 5, wherein said alkenyl pyridine is selected from the group consisting of:
2,4-divinylpyridine;
2,5-divinylpyridine;
2,6-divinylpyridine;
2-methyl-4,6-divinylpyridine;
4-methyl-2,6-divinylpyridine; and combinations thereof.

29. The process of claim 5, wherein said alkenyl pyridine is selected from the group consisting of:
5-bromo-3-vinylpyridine;
2-chloro-4-methyl-3-vinylpyridine;
2,6-dichloro-4-methyl-3-vinylpyridine; and combinations thereof.

30. The process of claim 5, wherein said alkenyl pyridine is selected from the group consisting of:
4-(2-hydroxyethyl)-2-vinylpyrdine;
4-propoxy-2-vinylpyridine;
N,N-dimethyl-2-(5-vinyl-2-pyridyl)-ethanamine;
N,N,N',N'-tetramethyl-2-(5-vinyl-2-pyridyl)-1,3-propane diamine;
N,N-dimethyl-2-(5-vinyl-2-pyridyl)-2propen-1-amine;
5-(3-bromo-isopropenyl)pyridine;
4-(1-acetoxyvinyl)pyridine; and combinations thereof.

31. The process of claim 5, wherein said interpolymerization is at a pressure of from about 100 MPa to about 200 MPa and a temperature of from about 100° C. to about 250° C.

32. The process of claim 5, wherein said reactor is operated on a batch basis.

33. The process of claim 5, wherein said reactor is operated continuously.

34. The process of claim 11 wherein said additional monomer is carbon monoxide.

35. The process of claim 34, wherein said additional monomer is selected from the group consisting of: propylene, 1-butene, 1-pentene, 1-hexene, 1-heptene, 1-octene, 1-decene and combinations thereof.

36. The process of claim 34, wherein said additional monomer is selected from the group consisting of: 1,3-butadiene, 1,4-pentadiene, 1,5-hexadiene, 1,7-octadiene, 1,9-decadiene, and combinations thereof.

37. The process of claim 34, wherein said additional monomer is selected from the group consisting of: acrylic acid, methacrylic acid, methyl methacrylic acid, ethacrylic acid, crotonic acid, isocrotonic acid, tiglic acid, angelic acid, senecioic acid, alkyl esters thereof, acrylonitrile, methacrylonitrile, allyl cyanide, methyl ally cyanide, and combinations thereof.

38. The process of claim 34, wherein said additional monomer is selected from the group consisting of: vinyl formate, vinyl acetate, and combinations thereof.

* * * * *